Figure 1:
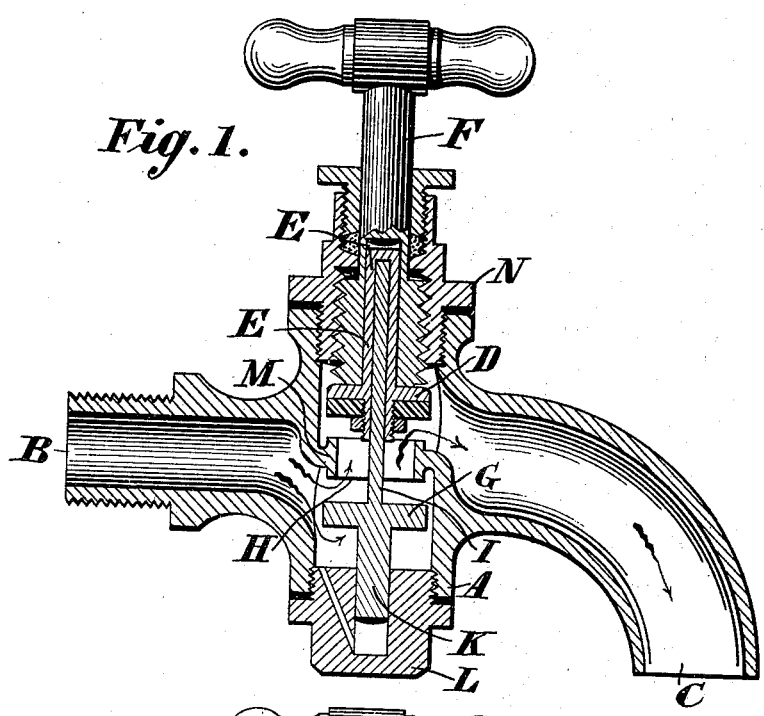

No. 624,855. Patented May 9, 1899.
S. A. PARKES & O. H. WAGNER.
SCREW DOWN TAP.
(Application filed Aug. 25, 1898.)
(No Model.) 3 Sheets—Sheet 1.

Witnesses
Inventors
Septimus A. Parkes
Orlando H. Wagner
By James L. Norris
Atty.

No. 624,855. Patented May 9, 1899.
S. A. PARKES & O. H. WAGNER.
SCREW DOWN TAP.
(Application filed Aug. 25, 1898.)

(No Model.) 3 Sheets—Sheet 2.

Witnesses
Inventors
Septimus A. Parkes
Orlando H. Wagner
By James L. Norris
Atty No. 624,855. Patented May 9, 1899.
S. A. PARKES & O. H. WAGNER.
SCREW DOWN TAP.
(Application filed Aug. 25, 1898.)

(No Model.) 3 Sheets—Sheet 3.

Witnesses

Inventors
Septimus A. Parkes
Orlando H. Wagner
By James L. Norris
Atty

UNITED STATES PATENT OFFICE.

SEPTIMUS ALEXANDER PARKES, OF SURBITON, AND ORLANDO HENRY WAGNER, OF LONDON, ENGLAND.

SCREW-DOWN TAP.

SPECIFICATION forming part of Letters Patent No. 624,855, dated May 9, 1899.

Application filed August 25, 1898. Serial No. 689,511. (No model.)

*To all whom it may concern:*

Be it known that we, SEPTIMUS ALEXANDER PARKES, residing at Holbrook, Park road, Surbiton, county of Surrey, and ORLANDO HENRY WAGNER, residing at 8 John street, Adelphi, London, England, subjects of the Queen of Great Britain, have invented certain new and useful Improvements in Ordinary Screw-Down Taps, of which the following is a specification.

This invention relates to screw-down taps operated by a screw-handle, the object being to provide such a tap with a follower-valve which shall close the passage for liquid and so prevent loss of water or necessitating the ordinary service being cut off or the cistern being emptied should the ordinary screw-down valve be removed for repairs or for a new washer to be fitted.

For the purpose of this invention we employ two valves in separate chambers of the tap-barrel. One valve—i. e., the lower—has a pin projecting centrally from each face. The upper pin is unusually long and fits a deep hole in the stem of the upper valve, while the other or short pin fits a hole in a bottom closing-plug. Either valve has play to bear against its own seating, one valve being used for shutting off the passage of liquid when the handle is turned in the proper direction and the other to automatically shut off the passage of liquid if the handle be unscrewed too much or if it be removed for any cause, such as for repairs of upper valve or removal of washer or otherwise. When the upper valve is raised by the inthrust of water when the handle is turned for the passage to open, the close fit of the upper pin of the lower valve within the tall stem of the upper valve produces a suction of one to the other, and this causes the lower valve to follow the upward travel of the upper valve, said follower-valve being also supported by a small quantity of water passing through a hole provided in the bottom closing-plug, which water enters and charges the space vacated by the up travel of the lower pin of the follower-valve. The lower valve can thus rise to follow the upper valve and be in a sense suspended, so that the water-passage of both valves is left open for the water to pass through the tap. When the upper valve has to be closed down upon its seat to shut off the passage, by turning the handle in the reverse direction the follower-valve is forced down thereby, and in this action the water in the space under the bottom pin of the lower valve is forced back through the hole of the bottom plug into the lower chamber.

Our invention is clearly represented on the annexed drawings, in which—

Figure 2:
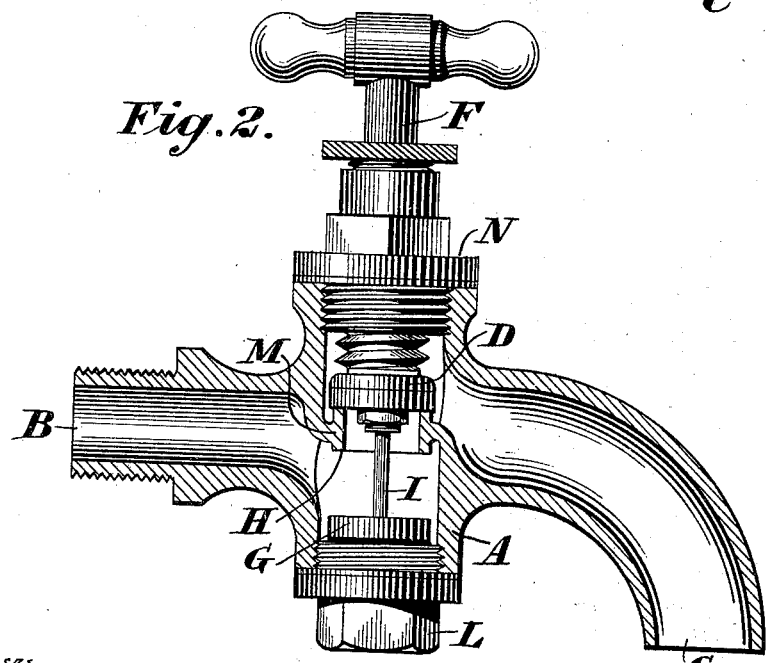
Figure 3:
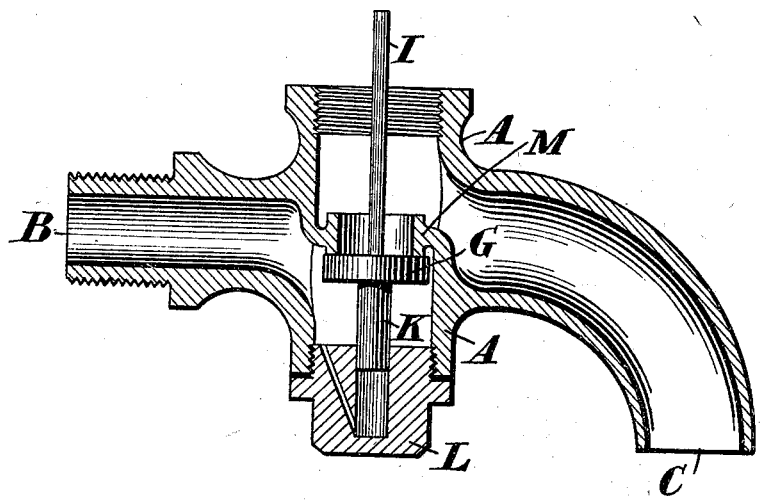
Figure 4:
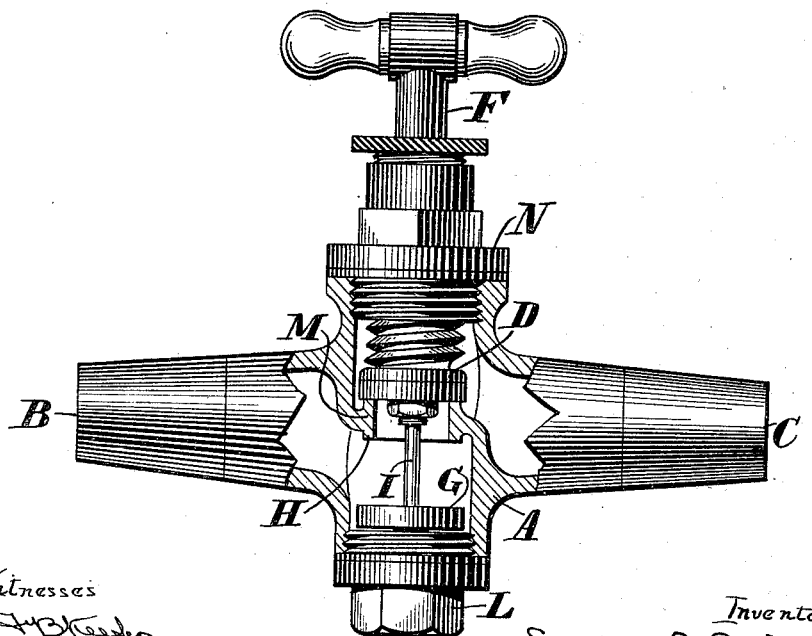
Figure 5:
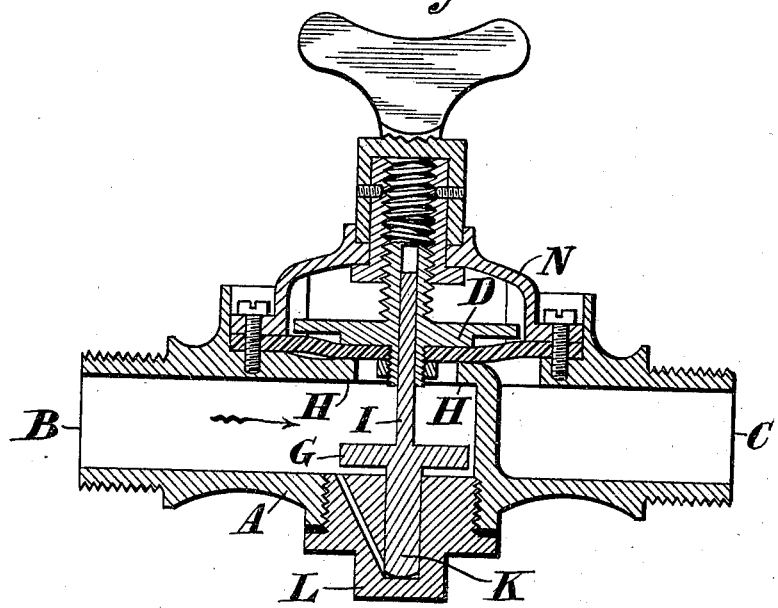
Figure 6:
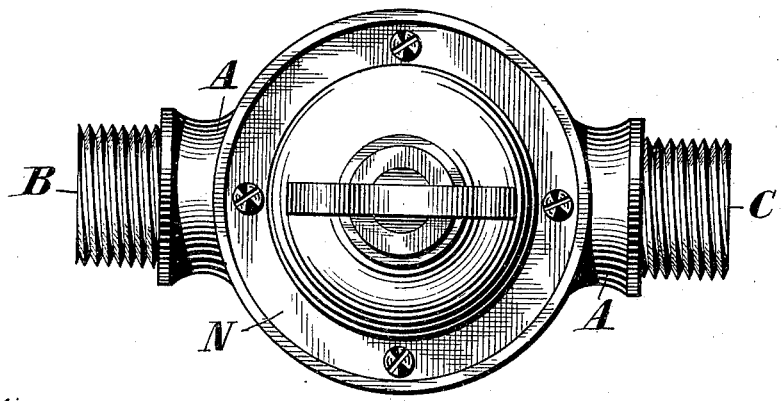

Figure 1 is a sectional elevation of a screw-down bib-tap with the loosely-fitted upper valve off its seat and the loosely-fitted follower-valve in position as raised by suction and supported by water-pressure to leave a clear waterway through the tap. Fig. 2 is a sectional elevation of same tap with upper loose valve on its seat to close the water-passage and with follower-valve forced down as far as it will go. Fig. 3 is a sectional elevation of same tap-barrel with the loosely-fitted follower-valve against its seating and the water-passage shut off, such as when the upper-loose valve appliances have been removed for a new valve or packing to be fitted or from other cause, the pressure of water then completely bearing against the under side of the loosely-fitted follower-valve, which pressure and consequent closure remain until the upper loose valve and its appliances are replaced and the screwing-down is being completed before the loosely-fitted follower-valve can move from its closed or shut-off position. Fig. 4 is a sectional elevation of a stop-cock with our invention applied. Fig. 5 is a sectional elevation of a diaphragm-tap with our invention applied. Fig. 6 is a plan of same.

A is the body or barrel of the tap.

B is the water-inlet; C, the water-outlet; D, the upper loosely-fitted valve, with hollow stem E and screw-down stem F for closing and under control of water for opening the through passage from inlet to outlet when the screw-stem F is raised, the extent of opening being determined by the number of rotations imparted to the stem F by action on the hollow stem E, all in the well-known manner, and G the follower-valve, fitting loosely in the lower part of the barrel A and consisting of a disk G, with a long stem or pin I projecting centrally from the upper face to enter a tubular portion of the stem E of the upper loose valve D, and of a pin K, projecting centrally from the lower face to enter a hole in the bottom closing-plug L, which hole, when the plug is in position in conjunction with the tubular portion of the stem E, serves to guide the loosely-fitted follower-valve in its vertical up-and-down motions.

The pin I just fits the tube of the stem E, and when the upper loose valve D is raised to open the water-passage the loose follower-valve G, by the combined action of grip on the pin I in the tube and the tendency of the inflowing water to pass under the valve G, causes a lift to said valve that it moves simultaneously with the upper loose valve, which it follows to the same extent as that of the upper loose valve or until the loose follower-valve G bears in direct contact with its own seating H of the core M, such as when the upper valve has to be removed for any cause.

We prefer that the follower-valve shall not cut off the supply until the upper plug N has been unscrewed about one-eighth of an inch beyond its usual distance.

The follower-valve G does not necessarily require a leather or rubber washer, and it is really immaterial whether its face accurately fits against its seating or not, because only a slight escape of water could take place during the loose upper valve's removal and its replacement. It is preferable, however, to make the face of the follower-valve and its seating coincide for accuracy of fit to prevent escape of water during the time the upper loose valve is removed.

The long pin I of the lower or follower valve projects beyond the top edge of the tap-barrel, so that when the upper valve has been removed, should it fall from any cause, such as when the water-pressure is reduced, it can be lifted by the fingers and the lower valve be put into contact with its seating.

By this invention if the loosely-fitted valve has to be removed for repair or renewal of washer it can be taken out, the water-passage being then closed by the follower-valve without the necessity of running the water from a cistern or of cutting off or closing the supply from the main.

What we claim, and desire to secure by Letters Patent, is—

1. In a screw-down tap having two loose valves one of which is a follower-valve consisting of a disk G with a long pin I projecting and engaging within a tubular projection of the upper valve, which tubular projection is within a tubular portion of the stem F, and of a pin K within a bottom plug L secured in lower end of barrel A as and for the purposes specified.

2. In a screw-down tap having two loose valves, one of which is a follower-valve G having a long upper pin engaging a tubular pin of the upper valve and a short lower pin engaging the bottom closing-plug and the other an uprising upper loose valve D serving as a stop-valve for automatically closing the water-passage should the upper loose valve be lifted too high or on being removed from the tap for repair or renewal of the upper valve-washer as specified.

In testimony whereof we have hereunto set our hands in presence of two subscribing witnesses.

SEPTIMUS ALEXANDER PARKES.
   ORLANDO HENRY WAGNER.

Witnesses:
 E. ARNEY SPEED,
 ALEX. RIDGWAY.